(12) United States Patent
Albrecht et al.

(10) Patent No.: US 7,482,826 B2
(45) Date of Patent: Jan. 27, 2009

(54) PROBE FOR SCANNING OVER A SUBSTRATE AND A DATA STORAGE DEVICE

(75) Inventors: Thomas Albrecht, San Jose, CA (US); Michel Despont, Au (CH); Urs T. Duerig, Rueschlikon (CH); Mark Lantz, Adliswil (CH); Hugo E. Rothuizen, Adliswil (CH); Dorothea W. Wiesmann Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 11/332,137

(22) Filed: Jan. 13, 2006

(65) Prior Publication Data

US 2008/0013437 A1      Jan. 17, 2008

(30) Foreign Application Priority Data

Jan. 13, 2005    (EP) .................................. 05405018

(51) Int. Cl.
    *G01R 31/02*    (2006.01)
(52) U.S. Cl. ..................................... 324/762
(58) Field of Classification Search ................. 324/762
    See application file for complete search history.

(56) References Cited

U.S. PATENT DOCUMENTS

| | | | | | |
|---|---|---|---|---|---|
| 4,197,866 | A | * | 4/1980 | Neal | 137/1 |
| 5,804,709 | A | * | 9/1998 | Bourgoin et al. | 73/105 |
| 6,667,467 | B2 | * | 12/2003 | Shimizu et al. | 250/201.3 |

* cited by examiner

*Primary Examiner*—Ha Tran T Nguyen
*Assistant Examiner*—Shaun Campbell
(74) *Attorney, Agent, or Firm*—Cantor Colburn LLP

(57) ABSTRACT

A data storage device comprises a storage medium for storing data in the form of marks and at least one probe for scanning the storage medium. The storage medium may be comprised in a substrate. The probe comprises a cantilever that comprises terminals serving as electrical contacts an being during operation of the probe mechanically fixed to a probe-holding structure, which may be a common frame of the data storage device. A probe further comprises a supporting structure, to which the terminals are mechanically directly coupled or coupled via hinges and which extends away from the terminals. A tip with a nanoscale apex is provided. A beam structure comprises a heating resistor and is attached at ends to the supporting structure. The beam structure is thinned at least in a direction parallel to an axis of the tip compared to an area of the supporting structure abutting the beam structure.

1 Claim, 3 Drawing Sheets

PROBE FOR SCANNING OVER A SUBSTRATE AND A DATA STORAGE DEVICE

TECHNICAL FIELD

The present invention relates to a probe for scanning over a substrate and a data storage device.

BACKGROUND OF THE INVENTION

In the field of this invention techniques are known that use nanometer sharp tips for imaging and investigating the structure of materials down to the atomic scale. Such techniques include atomic force microscopy and scanning tunneling microscopy, as disclosed in EP 0 223 918 B1 and U.S. Pat. No. 4,343,993.

Based on the developments of the scanning tunneling microscopy and the atomic force microscopy, new storage concepts have been introduced over the past few years profiting from these technologies. Probes having a tip with a nanoscale apex are being introduced for modifying the topography and for scanning an appropriate storage medium. Data are written as sequences of bits represented by topographical marks, such as indentation marks and non-indentation marks. The tips comprise apexes with a radius in the lower nanometer range and the indentation marks have for example a diameter in the range of 20 to 40 nm. Hence, these data storage concepts promise ultra-high storage area density.

A data storage device based on the AFM principle is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel, each probe scanning during operation an associated field of the storage medium. That way high data rates may be achieved. The storage medium comprises a thin polymethylmethacrylate (PMMA) layer. The tips are moved across the surface of the polymer layer in a contact mode. The contact mode is achieved by applying small forces to the probes so that the tips of the probes can touch the surface of the storage medium. For that purpose, the probes comprise cantilevers which carry the sharp tips on their end sections. Bits are represented by indentation marks or non-indentation marks in the polymer layer. The cantilevers respond to these topographic changes in the surface while they are moved across the surface. Indentation marks are formed on the polymer surface by thermomechanical recording. This is achieved by heating a respective probe with a current or voltage pulse during the contact mode in a way that the polymer layer is softened locally where the tip touches the polymer layer. The result is a small indentation on the layer having a nanoscale diameter.

Reading is also accomplished by a thermomechanical concept. The heater cantilever is supplied with an amount of electrical energy, which causes the probe to heat up to a temperature that is not high enough to soften the polymer layer as is necessary for writing. The thermal sensing is based on the fact that the thermal conductance between the probe and the storage medium, especially a substrate on the storage medium, changes when the probe is moving in an indentation as the heat transport is in this case more efficient. As a consequence of this, the temperature of the cantilever decreases and hence, also its electrical resistance changes. This change of electrical resistance is then measured and serves as the measuring signal.

In STM a sharp tip is scanned in close proximity to the surface and voltage applied between the tip and the surface gives rise to a tunnel current that depends on the tip-surface separation. From a data-storage point of view, such a technique may be used to image or sense topographic changes on a flat medium that represent a stored information in logical "0s" and "1s". In order to achieve reasonable stable current, the tip-sample separation must be maintained extremely small and fairly constant. In STM, the surface to be scanned needs to be of an electrically conductive material.

WO02/077988A2 discloses a method and an apparatus for writing data to and/or reading data from locations on a surface via a tip. The apparatus is designed for moving the tip between the locations on the surface. At each location, energy is selectively applied to the surface via the tip and the tip and the surface are selectively forced together in synchronization with the selective application of energy. Moving the tip into and out of contact with the surface is achieved by selective generation of a force field, which comprises an electric field.

WO02/37488A1 discloses read/write components for AFM-based data storage devices. The read/write component comprises lever means and a support structure. The lever means is connected to the support structure for substantially pivotal movement. The lever means provides first and second current paths between a pair of electrical supply lines on the support structure, via which the lever means can be connected in use to power supply means operable in a write mode and a read mode. A write-mode heater is provided on the lever means in the first current path, and a read/write tip is provided on the write-mode heater. A read-mode heater is provided on the lever means in the second current path.

In order for such a storage device to be competitive with other well known storage device technologies, like hard disk drives, power consumption should be low. Furthermore power consumption of a probe should be low.

SUMMARY OF THE INVENTION

According to one aspect of the invention, a probe for scanning over a substrate is provided, the probe comprising terminals, and a supporting structure, which is mechanically coupled to the terminals. The supporting structure may for example be mechanically directly coupled or coupled via hinges to the terminals. The supporting structure extends away from the terminals. The probe further comprises a tip with a nanoscale apex and a beam structure, which comprises a heating resistor which is attached at ends to the supporting structure and which is thinned at least in a direction parallel to an axis of the tip compared to an area of the supporting structure abutting said beam structure. The beam structure acting together with the supporting structure enables a reliable operation of the probe and permits a reduction of the mass to be heated. This enables in an easy way to reduce an amount of heat lost to the supporting structure and in that way enables to operate the probe with low power consumption.

In a preferred embodiment, the terminals act as as electrical contacts and are, during operation of the probe, mechanically fixed to a probe holding structure. However, the terminals can also act as mechanical terminals for fixing the supporting structure of the probe to the probe holding structure, or as electrical and mechanical contact to the probe holding structure. Preferably, the probe is held by a probe-holding structure at least during operation of the probe. The supporting structure can be permanently fixed to the probe-holding structure, and preferably may even form one piece with the probe-holding structure, while in some applications—such as in some AFM applications—the probe may be removable from the probe-holding structure, and consequently may be fixed to the probe-holding structure at least during operation of the probe.

In a preferred embodiment of the probe, an effective heating resistor distance within the beam structure from the heating resistor to each end of the supporting structure is comparable to or longer than half of an effective temperature decay length. The effective heating resistor distance is measured going through the beam structure from the respective heating resistor to the respective end of the beam structure measured in the material of the beam structure and therefore does not necessarily represent a geometric distance between the respective heating resistor and the respective end of the beam structure.

The effective temperature decay length depends on a thermal conductivity of the beam structure, on a thermal conductivity of a medium between the beam structure and the substrate, a spacing between the beam structure and the substrate and a thickness of the beam structure measured in a direction parallel to the axis of the tip. The effective heating resistor distance may by way of example be represented by a square root over a ratio of the thermal conductivity of the beam structure and the thermal conductivity of the medium between the beam structure and the substrate multiplied with the thickness of the beam structure and the spacing between the beam structure and the substrate. It has been observed that an amount of heat left in the beam structure at the effective heating resistor distance decreases exponentially with the effective temperature decay length.

By choosing this effective heating resistor distance to be comparable to or longer than half of the effective temperature decay length it can be assured that a fair amount of heat is lost to the substrate, which is desirable, by still having a great degree of design freedom for considering mechanical properties of the beam structure.

In a further preferred embodiment the effective heating resistor distance is comparable to or longer than the effective temperature decay length. This ensures that a high percentage of the heat generated in the heating resistor is lost to the substrate and heat dissipation in the supporting structure is very low.

According to a further preferred embodiment of the probe the effective heating resistor distance is comparable to or longer than twice the effective temperature decay length. This ensures, that almost all of the heat generated in the heating resistor is lost to the substrate and the amount of heat lost to the supporting structure is negligible.

According to a further preferred embodiment of the probe the heating resistor has a resistor length extending between two abutting leads of the beam structure, that is comparable to or less than the effective temperature decay length. That way an amount of heat needed to achieve a particular given temperature within the heating resistor may be kept fairly low and at the same time by having such a short heating resistor the mechanical properties of the beam structure may be provided in a desired way.

In a further preferred embodiment the heating resistor length is comparable to or less than half of the effective temperature decay length. By choosing the length of a heating resistor that way the amount of heat necessary to achieve the particular given temperature is minimized.

In a further preferred embodiment of the probe the heating resistor length is comparable to or is less than a quarter of the effective temperature decay length. This enables to design the beam structure in a mechanically highly stable way.

In a further preferred embodiment of the probe the beams of the beam structure have a width greater than the thickness of the beam structure. This has the advantage that the thermal sensitivity of the beam structure may easily be kept high. This is based on the finding that the thermal sensitivity of the beam structure decreases if the beams of the beam structure have a width smaller than the thickness of the beam structure and at the same time that the power consumption needed to achieve the particular given temperature does not decrease any more.

In a further preferred embodiment of the probe a carrier concentration in the heating resistor and a volume of the heating resistor is chosen in a way that a flicker noise does not exceed a thermal noise by one order of magnitude, that is by a factor of around 10 in the frequency range of interest. This enables to minimize the volume of the heating resistor in order to achieve a desired low level of power consumption without sacrificing a quality of a signal derived from that heating resistor.

Johnson noise represents a lowest reachable electrical noise level for a resistor of a given resistance R at a certain temperature T and with a given dissipated electrical power P. For the spectral resistance noise the density per 1 Hz bandwidth is in the case of the Johnson noise described as:

$$\frac{\Delta R_{noise}}{R} \text{ per 1 Hz bandwidth} = \sqrt{\frac{4kT}{P_{electrical}}} \quad (F1)$$

where k is the Boltzman constant. Besides this all resistors suffer from the flicker noise, which is also referred to by 1/f noise which dominates the electrical noise at lower frequencies. In the case of silicon cantilevers it is generally observed that the spectral resistance noise density follows $$\frac{d\frac{\Delta R_{noise}}{R}}{df} = \sqrt{\frac{\alpha}{fN}} = \sqrt{\frac{\alpha}{fnV}} \quad (F2)$$

where f is the frequency, $\alpha$ is the Hooge factor which depends on the quality of the material, and N the number of carriers in the resistor, which is the product of a carrier concentration n and a volume V. The Hooge factor varies for single crystalline silicon on insulator between $3 \times 10^{-6}$ and $3 \times 10^{-5}$. It, however, depends on different ways of incorporating and activating dopants. For a specific processing of the probe, if it is manufactured from silicon, the Hooge factor is assumed to be constant and may be used to predict the flicker noise. By allowing the flicker noise to at maximum exceed the Johnson noise by an order of magnitude this results in the following number of carriers, which are equal to the dopants if no compensation is present, as the lower boundary for the heating resistor being represented by $$N = \frac{1}{100} \cdot \frac{\alpha P_{electrical}}{4kTf} \quad (F3)$$

It is, however, preferred to allow the flicker noise not to exceed the Johnson noise by more than a factor of 2 at the lower bound of the relevant frequency range which then results in the number of carriers in the heating resistor being at the lower boundary represented by $$N = \frac{1}{4} \cdot \frac{\alpha Pelectrical}{4kTf} \quad \text{(F4)}$$

In a further preferred embodiment of the probe the beam structure is mechanically reinforced by at least one reinforcement element having an electrically insulating property and having a thermally insulating property. By properly placing that reinforcement element relative to the beam structure it may be prevented that the beam structure collapses onto the substrate, or undergoes other undesired excessive deformation during operation of the probe. In that way heat loss and overall power consumption for the beam structure may be kept low by suitable choices in the physical design of the beam structure, while the necessary mechanical stiffness may be retained by the use of at least one reinforcement element. In this respect it is preferred that the reinforcement element has a dielectric property, and further has a heat conductance at least three times less than silicon and has a modulus of elasticity of at least one-fifth of the modulus of elasticity of silicon. It has been shown that in that way the reinforcement element is well suited for its purpose.

In a further preferred embodiment of the probe the reinforcement element comprises silicon nitride. Silicon nitride has the advantage, that it is easy to deposit during a manufacturing process of the probe, especially if the probe is mostly manufactured from silicon.

In a further preferred embodiment of the probe the reinforcement element comprises silicon dioxide. Silicon dioxide has a high mechanical rigidity and a relatively low thermal conductivity and is therefore well suited for the reinforcement element. It is further advantageous, if the reinforcement element comprises ceramics or a polymer.

In a further preferred embodiment of the probe the reinforcement element is a reinforcement bridge, that is attached to the beam structure and to the supporting structure. A reinforcement bridge has the advantage, that it is very simple to design and to manufacture.

In a further preferred embodiment of the probe the reinforcement element is a reinforcement beam being attached to the beam structure at at least part of an extension of the beam structure. In that way high stiffness of the beam structure may be obtained in a simple way without significantly hurting the power consumption necessary for the beam structure.

In this respect it is advantageous, if the reinforcement beam extends fully along the beam structure. In this way a very high degree of stiffness may be obtained. In this respect it is further advantageous if the reinforcement beam extends from one of the ends of the beam structure towards the heating resistor and ends before the heating resistor. This may ensure a fairly high degree of stiffness of the beam structure and at the same time may ensure a larger proportion of heat conduction from the heating resistor to the substrate.

In a further preferred embodiment of the probe the reinforcement beams are attached in a sandwich manner to the beam structure, that is the beam structure is sandwiched between the reinforcement beams. In this way a very high degree of rigidity may be obtained.

In a further preferred embodiment the reinforcement beam is formed in a u-shaped cross section. In that way a high bending stiffness of the reinforcement beam may be obtained. In that respect it is further preferred to have a u-shaped cross-section tapering towards its extremities. In that way an even more improved high bending stiffness may be obtained.

In another preferred embodiment of the probe the beam structure is formed in a u-shaped cross section, that is the beams of the beam structure have a u-shaped cross-section. Also by this the bending stiffness of the beam structure may be highly improved. In this respect it is further advantageous if the u-shaped cross-section tapers towards its extremities.

In a further preferred embodiment of the, probe the heating resistor is formed in a beam of the beam structure comprising the heating resistor and adjoining leads on both ends of the heating resistor. The leads are attached to the supporting structure. The supporting structure comprises at least one bridge element mechanically coupling and electrically decoupling parts of the supporting structure. In that way the beam structure may be optimized in view of power dissipation needed to reach particular given temperatures, whereas its mechanical properties may be adjusted by the supporting structure. By having at least one bridge element mechanically coupling and electrically decoupling parts of the supporting structure it may be ensured that a short cutting of the respective heating resistor is prevented, as the supporting structure may also serve to conduct a current towards or away from the heating resistor.

Electrical decoupling by the at least one bridge element may also be achieved by interposing dielectric material as bridge element with sufficient small cross-sections. A resulting capacitance is then negligible.

In a further preferred embodiment of the probe the bridge element is a diode. In that way by simple doping the bridge element may be obtained and electrical short-cutting of the heating resistor may be prevented in most relevant cases.

In a further preferred embodiment the bridge element is formed by two reverse biased diodes. In that way short-cutting of the heating resistor may be prevented with high reliability.

In this respect it is advantageous, if the bridge element comprises a lateral cross-section with a sequence of a highly n-doped zone, a low n-doped zone, a highly p-doped zone and a highly n-doped zone. In that way a doping concentration for the leads may be chosen for the highly n-doped zone, whereas a further doping concentration for the low n-doped zone may be chosen the same as for the heating resistor. This results in only one additional doping fabrication step for the highly p-doped zone.

According to another aspect of the invention, a data storage device is provided, comprising a storage medium for storing data in the form of marks and at least one probe according to the first aspect of the invention. The possible preferred embodiment and advantages correspond to the first aspect of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

Different figures may contain identical references, representing elements with similar or uniform content.

DETAILED DESCRIPTION

Figure 1:
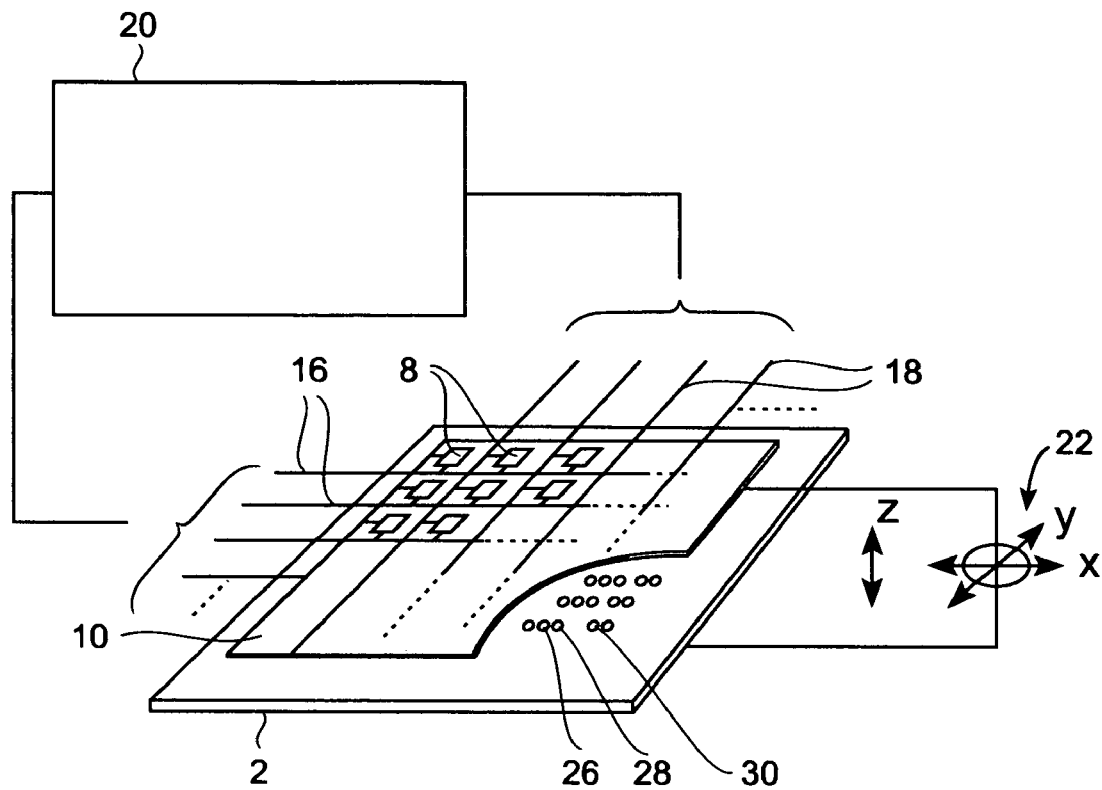
FIG. 1, a perspective view of a data storage device comprising probes.
Figure 2:
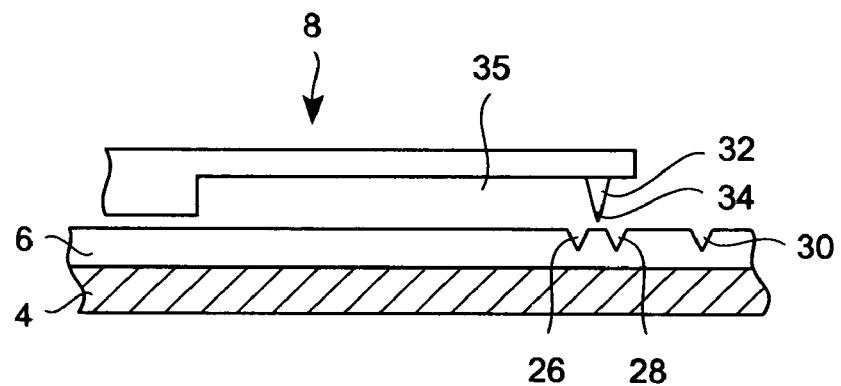
FIG. 2, a cross-sectional view of part of the storage device according to FIG. 1, FIG. 3, a first embodiment of the probe in a top view, FIGS. 4 to 8, different embodiments of beams of a beam structure of the probe, FIGS. 9 and 10, different embodiments of a cross-section of the beam, FIG. 11, a second embodiment of the probe in a top view, FIG. 12, a perspective view of a third embodiment of the probe comprising bridge elements and FIG. 13, an embodiment of the bridge element according to FIG. 12 in cross-sectional view.

FIG. 1 shows a perspective view of a data storage device that is used for storing data. The data storage device comprises a substrate 2, which may consist of a base substrate 4 (FIG. 2) and a surface substrate 6. The base substrate 4 is preferably manufactured from silicon. The surface substrate 6 may be formed of a thin polymethylmethacrylat (PMMA) layer. The surface substrate 6 may, however, also consist of different materials like an electrically conductive material or patterned magnetic material. The surface substrate 6 may also be referred to as storage medium.

An array of probes 8 is mounted on a common frame 10. Only a few probes 8 are shown in FIG. 1. The data storage device may, however, comprise a large number of probes, such as 1024 or even a significantly larger number of probes 8. However, the data storage device may also comprise just one probe 8. In addition to that the probe 8 may also be used for other purposes than for storing data. In that way the probe 8 may also be used in the field of probe microscopy, for example. Each probe 8 comprises terminals, preferably first, second and third terminals 11, 12, 14 (see FIG. 3), which are electrically connected to a control and information processing unit 20 via electrically conductive lines.

The terminals 11, 12, 14 of each probe 8 may all be individually directly connected to the control and information processing unit 20. However, in order to reduce the complexity of the wiring, the terminals 11, 12, 14 may also be connected via row-lines 16 and column-lines 18 and possibly via non-shown multiplexers to the control and information processing unit 20.

The control and information processing unit 20 is designed for creating control parameters applied to the probes 8 via their terminals 11, 12, 14 or sensing parameters present on the terminals 11 to 14, such as a current or a voltage potential. The control and information processing unit 20 is further designed for controlling a movement of the substrate 2 relative to the frame 10 in an x and y-direction and possibly in a z-direction. The actuation for this is accomplished by a scanner 22.

Hence, the substrate 2 and the frame 10 containing the probes 8 are moveable relative to each other. A relative movement in the z-direction may also or in addition be accomplished by applying respective electrostatic forces on the probes 8.

In the surface substrate 6 marks 26 to 30 are present, which represent a logical information. Preferably, they form topographic marks and may represent as indentation marks logical "1"s whereas the absence of the indentation marks may represent logical "0"s. The marks 26 to 30 are of a nanoscale diameter. In FIG. 1 only a few marks 26 to 30 are shown, which also do not represent their real physical properties. The few marks 26 to 30 are just shown by way of example.

The probe 8 is a spring cantilever with the terminals 11, 12, 14 being mechanically fixed to the frame 10. The probe comprises a tip 32 with a nanoscale apex 34, preferably having a radius in the low nanometer range, preferably in a range of 100 nm or less, in another preferred embodiment in a range of 50 nm or less, in a further preferred embodiment in a range of 10 nm or less, and according to another preferred embodiment in a range of 20 to 40 nm. The tip is facing the surface substrate 6. The indentations 26 to 30 are created by applying a combination of force and heat via the probe 8 to the base substrate 6. The marks 26 to 30 are detected by sensing whether the tip 32 has moved into one of the indentations 26 to 30, or not. In the preferred thermomechanical concept for the probe 8 each probe 8 comprises a first heating resistor 66 for writing and a second heating resistor 68 for reading. During a write mode of the probe, the probe is scanned across the substrate and whenever a mark 26 to 30 is to be created the fire heating resistor 66 is heated up to a given temperature, which results in heat conduction towards the base substrate 6 via the tip 32. In that way the base substrate 6 is locally softened, which then leads, in combination with a force being applied to the base substrate via the tip 32, to the creation of one of the indentation marks 26 to 30.

In a read mode the second heating resistor 68 is either permanently or intermittently heated up to a further given temperature and a change in heat dissipation caused by change in a distance parallel to an axis of the tip when the tip 32 moves into one of the marks 26 to 30 is sensed and in that way the respective mark 26 to 30 is detected.

The probe 8 comprises coupling elements, also referred to as hinges 42, 44, 46, 48 (FIG. 12) which abut to the first to third terminals 11, 12, 14. The hinges 42 to 48 mechanically couple a supporting structure with the terminals 11, 12, 14 and in that way with the frame 10. The supporting structure extends away from the hinges and comprises legs 36, 38 and may comprise a capacitive platform 40. The supporting structure may also directly abut the terminals 11, 12, 14. The hinges 42, 44, 46, 48 serve the purpose of setting a spring constant for the spring cantilever. The probe further comprises a beam structure 50, which comprises the first and second heating resistors 66, 68. In a simpler embodiment the probe 8 may also comprise only one heating resistor, which is then used for the writing mode and the read mode. In the first embodiment of the probe 8 according to FIG. 3 the beam structure 50 comprises first to third beams 52, 54, 56. The beams are arranged in an arrow-like shape and are attached to the supporting structure at their ends. The beam structure 50, and in that way the beams 52, 54, 56, are tapered at least in a direction parallel to an axis of the tip 32 compared to an area of the supporting structure abutting the beam structure. This means that a thickness of the beams 52, 54, 56 is substantially less than a corresponding thickness of the supporting structure.

Figure 3:
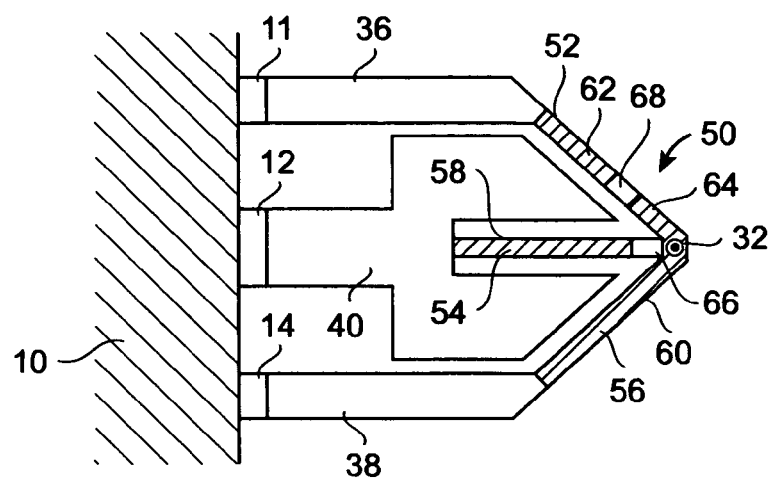

In the embodiment of the probe according to FIG. 3 the tip 32 is located on a crossing point of the first to third beams 52, 54, 56. The beams 52, 54, 56 comprise first to fourth leads 58, 60, 62, 64 serving as an electrical connection for the respective heating resistors 66, 68 to the supporting structure.

The supporting structure may consist of various structural parts which may be provided for electrical conductance purposes but which do not necessarily need to be provided for electrical conducting purposes. Instead some of the various parts may also be only provided for pure mechanical stability reasons. In the first embodiment of the probe 8 the supporting structure comprises the legs 36, 38 and a capacitive platform 40. The leg 36 electrically connects the first terminal 11 to the third lead 62. The leg 38 connects the third terminal 14 electrically to the second lead 60. The capacitive platform 40 serves the double purpose of electrically connecting the first terminal 12 with the first lead 58 and providing a first electrode of a capacitor, which is formed by that first electrode, a second electrode and a medium between the first and second electrode. It is preferred that the second electrode is formed in the substrate 2. In this case the medium between the first and second electrode is the medium 35 between the probe 8 and the substrate 2. The second electrode may, however, also be located in a way that the probe 8 is located between the second electrode and the substrate. It is important, that the second electrode is arranged in a fixed position relative to the substrate 2.

By providing the first and second electrodes with suitably chosen voltage potentials an electrostatic force acts between the probe 8 and the substrate 2. In that way a z-position of the probe 8 may be controlled and also the force exerted by the tip 32 on the surface substrate 6 may be set.

However, the first beam 54 does not necessarily need to be electrically coupled to the second terminal 12 via the capacitive platform 40, it may rather also be coupled to the second terminal 12 via a further leg.

The probe 6 may preferably be manufactured entirely from silicon. In this case the terminals 11, 12, 14, the hinges 42, 44, 46, 48, the legs 36, 38 and the capacitive platform 40 are preferably highly n-doped in order to have a low electrical resistance. The leads 58, 60, 62, 64 are also preferably highly n-doped in order to have a low electrical resistance. For manufacturing purposes it is preferred that the supporting structure and the leads 58, 64 have the same doping concentration as this enables to dope them in one manufacturing step. The first and second heating resistors 66, 68 are preferably formed by doping respective areas of the beam structure 50 with a substantially lower doping concentration than the rest of the beam structure 50. The heating resistor 66, 68 may for example have an electrical resistance of around 11 kΩ for a given temperature within the range of operation of the probe 8.

Figure 12:
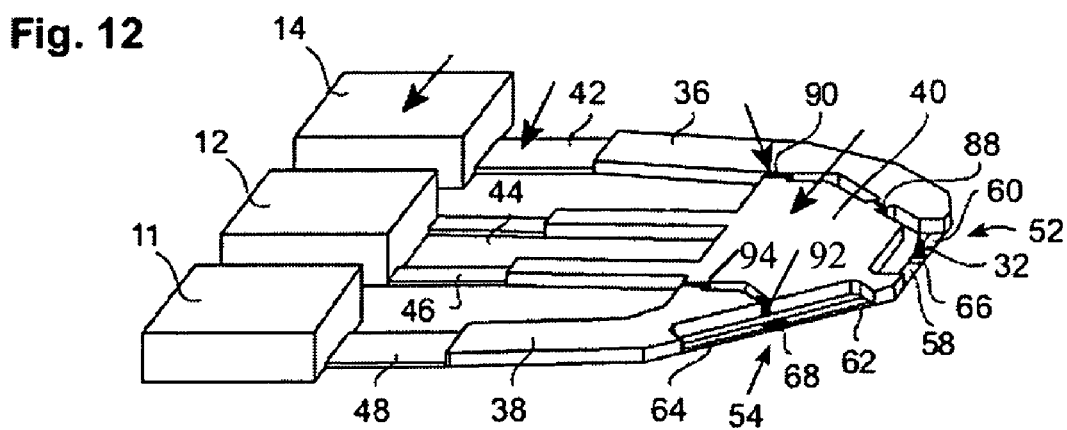

The thickness of the beams 52,54,56 of the beam structure 50 is substantially less than the respective thickness of the supporting structure, which can be seen by the representation of a third embodiment of the probe in FIG. 12 but is also the case for the other embodiments of the probe. The thickness of the beam structure may for example be less than one-fifth of the respective thickness of the supporting structure.

An effective heating resistor distance within the beam structure from a respective heating resistor 66, 68 is given by the distance resulting when going through the material of the beam structure 50 towards the respective ends of the beam structure 50. This effective heating resistor distance is characteristic for an amount of heat which may be conducted into the supporting structure. In order to minimize a heat loss into the supporting structure the effective heating resistor distance is chosen to be longer than or equal to half of an effective temperature decay length λ or longer than or equal to the effective temperature decay length λ or longer than twice the effective temperature decay length, also taking into consideration mechanical stability restrictions. In the first embodiment of the probe 8 the effective heating resistor distances of the beam structure are preferably chosen to be longer than or equal to one effective temperature decay length λ.

The effective temperature decay length may be represented by the following formula $$\lambda = \sqrt{\left(\frac{\chi_{SI}}{\chi_{AIR}} * h * t\right)} \quad (F5)$$

where $\chi_{Si}$ represents the thermal conductivity of silicon, which amounts approximately to 50 μW/K*μm, and $\chi_{AIR}$ is the thermal conductivity of air, which amounts approximately to 25 nW/K*μm in the dimension regime of interest here. h is a spacing between the respective beam 52, 54, 56 and the surface substrate 6. As the spacing h may vary during the operation of the probe 8, especially when the tip 32 moves into an indentation a given nominal spacing may be considered for this purpose, which may be the spacing, when the tip 32 is not in an indentation mark. t denotes the thickness of the beams 52, 54, 56 parallel to the axis of the tip 32. Preferably the spacing h and the thickness t of the beams 52, 54, 56 are chosen in order to minimize the effective temperature decay length λ taking, however, into consideration necessary mechanical properties of the beam structure 50 and also manufacturing restrictions.

A length of the heating resistor 66, 68 is chosen to be less than the effective temperature decay length λ or less than half of the effective temperature decay length λ or less than or equal to a quarter of the effective temperature decay length. In the first embodiment of the probe the length of the heating resistors is preferably chosen in the range of half of the effective temperature decay length λ. The width of the heating resistors 66, 68 and also of the leads 58, 60, 62, 64 is chosen to be greater than the respective thickness t. If the length of the heating resistors 66, 68 is chosen to be less than or equal to half of the effective temperature decay length the amount of electrical energy needed to heat up the respective heating resistor 66, 68 to the given temperature remains the same and does not decrease anymore. If the width is smaller than the respective thickness, e.g. the power consumption does not decrease but the sensitivity for changing the z-direction of the heating resistor and the overall beam structure decreases.

The heating resistors 66 and the leads 58, 60, 62, 64 do not need to have the same width and the same thickness t and in that way also may be spaced at a different distance h to the surface substrate 6. In this case formula F5 needs to take into account these different dimensions. It is to be noted that a thermal time constant of the probe 8, which limits the maximum data transfer rate also depends on the spacing h of the respective beam 52, 54, 56 from the base substrate 6 and the thickness t of the beam. The thermal time constant depends on the product of these two parameters, it is therefore evident that by minimizing this product the thermal time constant of the probe can also be significantly reduced and in that way a maximum data transfer rate may be increased.

The doping concentration in the heating resistors 66, 68 is chosen in combination with a volume of the respective heating resistors 66, 68 in order to have the flicker noise not exceed the Johnson noise by more than one order of magnitude and preferably by a factor of two at the lower boundary of the frequency range of interest. The frequency range of interest comprises the frequencies under which respective electrical signals are provided to the heating resistors 66, 68.

The beam structure 50 may in part or also fully be reinforced by at least one reinforcement element, examples of which are shown in the following FIGS. 4 to 10. The reinforcement elements have an electrically insulating property and have a thermally insulating property. For that purpose the reinforcement elements, which in the case of the FIGS. 5 to 8 are formed as reinforcement beams should have a dielectric property, have a heat conductance at least three times less than silicon and have a modulus of elasticity of at least one-fifth of the modulus of elasticity of silicon. A preferred choice of material is silicon nitride, as this can simply be deposited during the manufacturing process of the probe 8. Silicon dioxide is preferred for its mechanical properties, but also ceramics or a polymer suitable for the temperature range of operation of the probe may be a preferred choice.

Figure 4:
Figure 5:
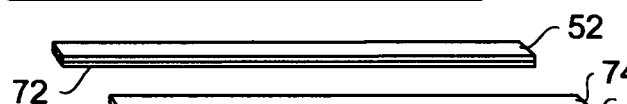

FIG. 4 just shows, by way of example, the first beam 52 of the beam structure 50. FIG. 5 shows the first beam 52 with a reinforcement beam 72 adjoined to it over its whole length.

Figure 6:
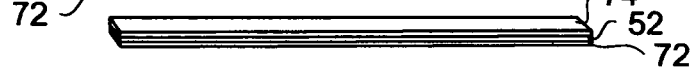
Figure 7:
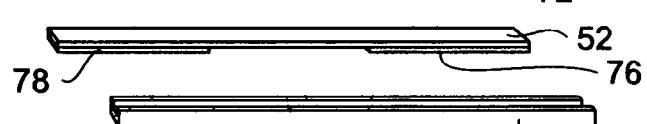
Figure 8:
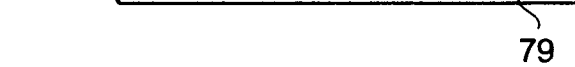

FIG. 6 shows the first beam 52 being arranged in a sandwiched manner between reinforcement beams 72 and 74. The reinforcement beams 72 and 74 may extend over the whole length of the beam 52 but they may also just partially extend along the length of the beam 52. FIG. 7 shows a further possibility of arranging reinforcement beams 76, 78. FIG. 8 shows a reinforcement beam 79 with a u-shaped cross-section, which greatly enhances the stiffness of the reinforcement. The reinforcement beam 79 may also have a u-shaped cross-section with the free ends of the u tapering towards the respective free ends.

The other beams 54 and 56 may also be reinforced by respective reinforcement beams 72, 74, 76, 78, 79.

Figure 9:
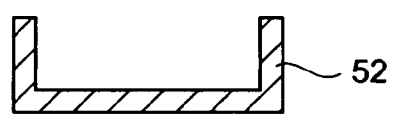
Figure 10:
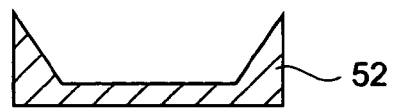

FIGS. 9 and 10 show two different ways from which the beam 52 but also the second and third beams 54, 56 may deviate in their cross-section from the rectangular form. In FIG. 9 the cross-section of the respective beam 52 is of a u-shape. In FIG. 10 the cross-section of the first beam 52 is of a u-shape with the first beam 52 tapering towards its free ends. In that way the rigidity of the first beam may be increased without a significant increase in an electrical heating power to reach the given temperature during the write mode or the read mode. The reinforcement beam 72, 74, 76, 78, 79 may also be obtained by plasma-enhanced chemical vapor deposition of silicon nitride.

Figure 11:
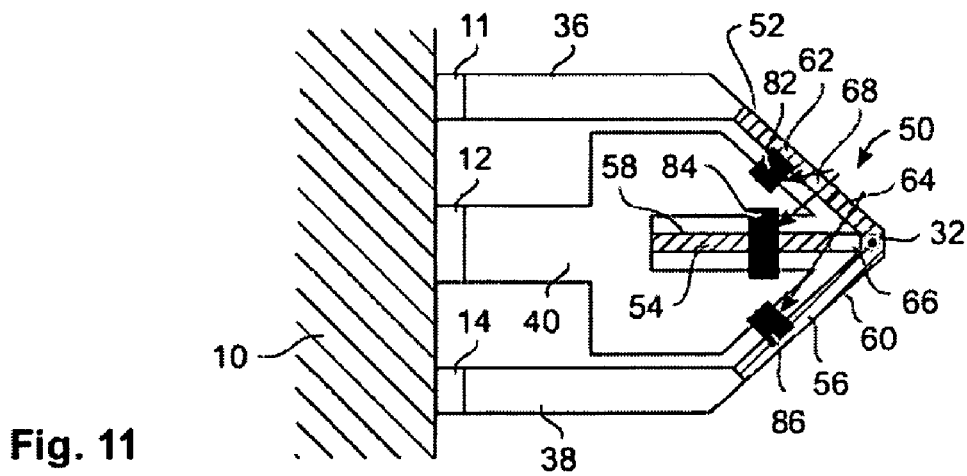

In a second embodiment of the probe 8 (FIG. 11) the beam structure 50 is mechanically reinforced by reinforcement bridges 82, 84, 86, that are attached to the beam structure 50 and to the supporting structure. The reinforcement bridge 82 is attached on one of its ends to the third lead 62 and on its other end to the capacitive platform 40. The reinforcement bridge 84 has three ends, two of which are attached to the capacitive platform 40 and one end in the middle, which is attached to the second beam 54. The reinforcement bridges 82, 84, 86 should be formed of a material which is electrically insulating in order to prevent short-cutting of the respective heating resistors 66, 68. However, depending on where the respective reinforcement bridge is attached to, this may not be a necessary property, as is the case for the reinforcement bridge 84. The reinforcement bridges 82, 84, 86 should however be thermally insulating.

FIG. 12 shows a third embodiment of the probe 8. The beam structure comprises the first and second beam 52, 54. The first and second beams 52, 54 are each attached at both of their respective ends to the supporting structure. The first beam 52 is attached at one of its ends to the leg 36 and on its other end to the capacitive platform 40. The second beam 54 is attached at one of its ends to the leg 38 and at the other end to the capacitive platform 40.

The first beam 52 comprises the first and second leads 58, 60 and the first heating resistor 66. In addition to that the tip 32 is arranged on the first beam 52 protruding away from the first heating resistor 66. The second beam 54 comprises the third and fourth leads and the second heating resistor 68.

The legs 36, 38 are mechanically connected to the capacitive platform 40 via bridge elements 88, 90, 92, 94, which electrically decouple the legs from the capacitive platform 40 but mechanically couple them. By having the beams 52, 54 held on both of their respective ends by the supporting structure and the supporting structure acting to tension the beams 52, 54, the beams 52, 54 may themselves be dimensioned in order to minimize electrical power consumption and to decrease the thermal time constant of the probe 8 with only small restrictions concerning mechanical properties of the beams 52, 54.

The bridge elements 88, 90, 92, 94 may be formed in a simplest embodiment of a dielectric material which then should have a very small cross-section in order to create a capacitance of negligible value.

It is, however, preferred to form these bridge elements 88, 90, 92, 94 as diodes. In this case a n-doped zone n may be obtained by part of the respective leg 36, 38 or the capacitive platform 40. A p-doped zone p may be obtained by doping a respective zone of the bridge element 88, 90, 92, 94 with opposite dopants. It is preferred, however, to embody the bridge elements 88 to 94 as two reverse biased diodes such that the electrical isolation effect is not dependent on the polarity.

Figure 13:
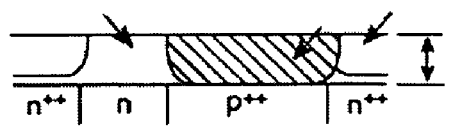

FIG. 13 shows a preferred embodiment of the bridge elements 88 to 94 based on two reverse biased diodes. In this embodiment the bridge element 88 to 94 comprises a sequence of a first highly n-doped zone n++, a low n-doped zone n, a highly p-doped zone p++ and a highly n-doped zone n++. The highly n++-doped zones may have a doping concentration being equal to the doping concentration of the legs 36, 38 and the capacitive platform. The low n-doped zone may have a doping concentration equal to the doping concentration within the first and second heating resistor 66, 68. The p-implant in the p++ highly p-doped zone should have a high enough concentration and be deep enough to have the p-dopant type predominant in the entire thickness of the bridge element. Looking at the lateral doping profile this leads in fact to two diodes in opposition. First, n++p++ diode which, because of the high doping concentration of both dopant types, has a low breakdown voltage, and a p++nn++ diode. This concentration has a non-symmetric current/voltage characteristic which, for electrical insulation, has a higher breakdown voltage when the junction p++n is in reverse bias. The direction of the doping sequence should be chosen taking this into account depending on the typical signal properties being predominant at the first to third terminals 11, 12, 14 during operation of the probe 8. The doping zone length should be calculated to avoid breakdown by punch-through but should also accommodate the alignment tolerance between the different implantations. To minimize a reverse bias diode leakage current the bridge element cross-sections should be chosen to be fairly small and delineating trenches between the different structural parts of the supporting structure may be provided. In this case only narrow bridge elements 88 to 94 may be provided.

It is clear from the above description that the different features of the various described embodiments of the probe may be combined. for example the beams 52, 54 of a third embodiment according to FIG. 12 may also be reinforced by reinforcement elements, such as the reinforcement beams 72, 74, 76, 78, 79 and/or the reinforcement bridges 82, 84, 86.

The invention claimed is:

1. A probe configured to scan over a substrate, comprising:
   terminals;
   a supporting structure that extends away from the terminals;
   at least one bridge element, including two reverse based diodes and a lateral cross-section including a sequence of a highly n-doped zone, a low n-doped zone, a highly p-doped zone and a highly n-doped zone, the at least one bridge element being configured to mechanically couple to and to electrically decouple the supporting structure from the terminals;

a tip with an apex disposed thereon and having a radius of 10 nm or less or 20-40 nm;

a beam structure including a heating resistor, which is mechanically attached at ends thereof to the supporting structure, and which is thinned at least in a direction parallel to an axis of the tip compared to an area of the supporting structure abutting the beam structure; and at least one dielectric and thermally insulating reinforcement beam, having a u-shaped cross-section tapering towards extremities thereof, attached to and extending fully along an extension of the beam structure and toward, but not along, the heating resistor, the reinforcement beam being configured to thereby mechanically reinforce the beam structure, wherein a distance from the heating resistor to each end of the beam structure is equal to or longer than half of a temperature decay length.

* * * * *